May 26, 1931.  R. JONTOF  1,806,689

CURVED MOUTHPIECE FOR MOUTH ORGANS

Filed Sept. 11, 1929

Patented May 26, 1931

1,806,689

UNITED STATES PATENT OFFICE

RUDOLF JONTOF, OF HAMBURG, GERMANY

CURVED MOUTHPIECE FOR MOUTH ORGANS

Application filed September 11, 1929. Serial No. 391,799.

This invention relates to a mouthpiece for mouth-organs, which enables one to reproduce in such instruments the several tones so that the adjacent tones do not vibrate with the same, for instance for tuning, and further to blow the tones in chords.

One of the objects of the invention is, to make it possible to blow on mouth-organs also diatonic and chromatic melodies with harmonious accompaniment. It is of special importance that the mouthpiece according to the invention is constructed so that it can be placed on the well known compartment bodies of a mouthpiece, in which all sound bodies are arranged in one or several rows closely side by side. To these sound bodies correspond the outlet openings of the mouthpiece channels which, according to the invention, traverse the mouthpiece in such a manner that on the surface blowing holes are produced which are separated from one another and arranged in two or more rows, those in the one row being displaced with regard to those in the other rows. The blowing holes on the surface of the mouthpiece might for instance be arranged so that the holes of the middle row serve for blowing the fundamental tones $c, d, e, f, g, b$ and $a$, the holes of the upper row displaced with regard to the tones of the middle row for blowing the chromatic tones $c$ sharp, $d$ sharp, $e$ sharp, $f$ sharp, $g$ sharp, $a$ sharp, and $h$ sharp, and the holes of the lower row displaced with regard to those of the middle row for blowing the tones $c$ flat, $d$ flat, $e$ flat, $f$ flat, $g$ flat, $a$ flat and $b$ flat.

The surface of the mouthpiece is so constructed that, if necessary, tones from the one row can be blown together with tones from the other row by covering or liberating according to requirement several tones of the one or other row with the lips or tongue. With this object in view the surface of the mouthpiece is prismatic or curved, incisions having been made in the surface of the mouthpiece between the rows of holes, if this should be desired.

Several embodiments of the invention are illustrated by way of example in the accompanying drawings.

Figure 1:
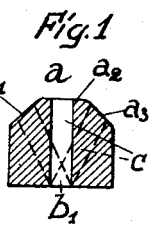
Fig. 1 shows in cross section a mouthpiece with a surface having three faces.
Figure 3:
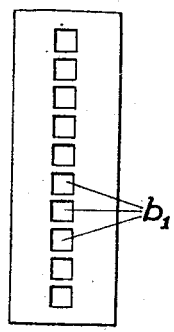
Fig. 3 is a plan view of Fig. 1 seen from below.

The mouthpiece $a$ shown in Fig. 1 has a surface with three faces $a_1, a_2, a_3$. The holes $b_1$ on the lower side of the mouthpiece $a$, leading to the chamber bodies of the wind chest, are arranged side by side as shown in Fig. 3, the blowing holes $b_2$ on the upper surface being separate from one another. The tone channels $c$ connecting the holes $b_1$ and $b_2$ traverse consequently the mouthpiece $a$ so that the individual rows can not only be blown easily but can be covered or released with the lips for harmony playing.

Figure 4:
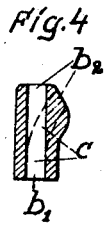
Fig. 4 shows in cross section a mouthpiece with a playing surface having two faces.
Figure 2:
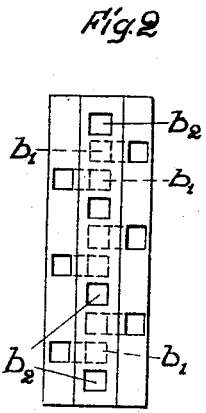
Fig. 2 is a top plan view of Fig. 1.

As shown in Fig. 4 only two playing faces are provided and accordingly two blowing rows $b_2$.

Figure 5:
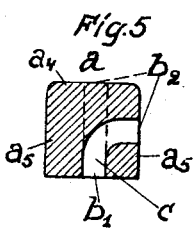
Fig. 5 shows a mouthpiece of rectangular cross section.

Fig. 5 shows a mouthpiece $a$ of rectangular cross section so that one row of blowing holes $b_2$ is in the horizontal surface $a_4$ and the other rows one in each side face $a_5$, the outlet holes $b_1$ in the lower surface being arranged side by side as in Fig. 3. The channels $c$ from the sides $a_5$ may be bent at right angles or inclined as shown in Fig. 1.

Figure 6:
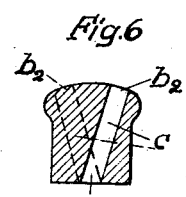
Fig. 6 shows a mouthpiece with curved surface.
Figure 7:
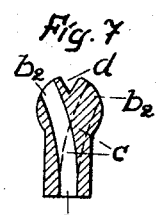
Fig. 7 shows a mouthpiece having incisions between the rows of holes.

The mouthpiece shown in Fig. 6 has a curved surface and, as shown in Fig. 7 incisions $d$ may be arranged between the rows of holes $b_2$ for the purpose that, when blowing only one row of holes the upper lip can rest in the incisions $d$ so as not to blow into the other row of holes at the same time.

Figure 9:
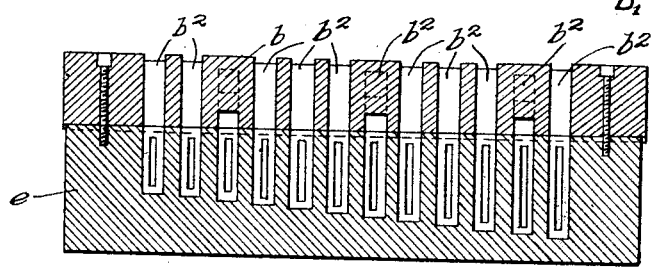
Fig. 9 is a horizontal section through a harmonica with mouthpiece attached.
Figure 8:
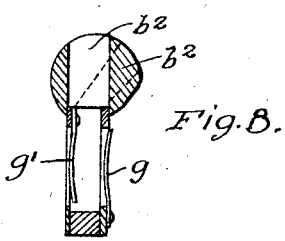
Fig. 8 shows in cross section a mouthpiece attached to a harmonica.

As shown in Figs. 8 and 9 two rows of reeds $g, g'$ are provided, the reeds of row $g$ operated by blowing and the reeds of row $g'$ by suction. One blowing channel in the mouthpiece controls two opposite reed zones. Whereas the individual reeds in the reed plate e are situated side by side, that is in one row or in two parallel rows, the blowing apertures in the mouthpiece are displaced, the blowing channels extending through the mouthpiece in downward direction. It is therefore possible to blow the small reeds placed side by side separately the one from the others, as the upper blowing channels so to speak allow to blow the one kind of reeds on the one side and the other kind of reeds on the other side of the mouthpiece. Consequently it is possible, amongst other things, to arrange closely side by side in the harmonica body, besides the usual reeds also, the reeds tuned to a half tone lower or higher, which was hitherto not possible as it was then not possible to blow accords, only discords would have been obtained as together with the full tones the half tones would have sounded. However now, that the blowing openings in the mouthpiece are separated, it is possible to arrange, for example, the half tones on one side of the mouthpiece without there being any danger of discords sounding.

I claim:—

1. A mouthpiece for mouth-organs, in which the blowing channels traverse the mouthpiece from the compartment body of the mouthpiece so that two blowing holes on the surface of the mouthpiece are separated from one another arranged in several rows the lower end of said channels being situated side by side in one row on the lower surface of the mouthpiece so that the tones of the compartment body of the mouthpiece lying close together can be blown separately or in desired chords.

2. A mouthpiece for mouth-organs as specified in claim 1 of prismatic shape the rows of blowing holes arranged on the prism faces so that they can be blown separately or together whereas the inner ends of the channels are lying side by side.

3. A mouthpiece for mouth-organs as specified in claim 1, having a curved top surface and radially bored channels.

4. A mouthpiece for mouth-organs as specified in claim 1, having incisions between the rows of blowing holes for guiding the upper lip, when only one row of holes is to be blown into.

In testimony whereof I affix my signature.

RUDOLF JONTOF.